United States Patent
Kimura et al.

(10) Patent No.: US 10,574,516 B2
(45) Date of Patent: Feb. 25, 2020

(54) MANAGEMENT APPARATUS AND SHARED NETWORK SYSTEM

(71) Applicant: FUJITSU LIMITED, Kawasaki-shi, Kanagawa (JP)

(72) Inventors: Masanori Kimura, Mishima (JP); Masakazu Fukaya, Kawasaki (JP); Jun Tanaka, Yokohama (JP); Toshio Sugimoto, Atsugi (JP); Minoru Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 15/677,714

(22) Filed: Aug. 15, 2017

(65) Prior Publication Data

US 2018/0077009 A1 Mar. 15, 2018

(30) Foreign Application Priority Data

Sep. 9, 2016 (JP) ................... 2016-176146

(51) Int. Cl.
*G06F 15/173* (2006.01)
*H04L 12/24* (2006.01)

(52) U.S. Cl.
CPC ............ *H04L 41/08* (2013.01); *H04L 41/022* (2013.01); *H04L 41/0873* (2013.01); *H04L 41/50* (2013.01); *H04L 41/02* (2013.01); *H04L 41/12* (2013.01)

(58) Field of Classification Search
CPC ... H04L 41/08; H04L 41/022; H04L 41/0873; H04L 41/50; H04L 41/02; H04L 41/12

USPC ......................................... 709/223
See application file for complete search history.

(56) References Cited

U.S. PATENT DOCUMENTS

| | | | |
|---|---|---|---|
| 2010/0124174 A1 | 5/2010 | Shimada | |
| 2014/0066098 A1* | 3/2014 | Stern | H04W 4/18 455/456.3 |
| 2015/0095174 A1* | 4/2015 | Dua | G06Q 20/20 705/21 |

(Continued)

FOREIGN PATENT DOCUMENTS

| JP | 2008-124791 | 5/2008 |
|---|---|---|
| JP | 2010-124162 | 6/2010 |

*Primary Examiner* — Sm A Rahman
(74) *Attorney, Agent, or Firm* — Fujitsu Patent Center

(57) ABSTRACT

A disclosed management apparatus that manages communication in a network shared by information processing apparatuses of plural users includes: a memory and a processor coupled to the memory. And the processor is configured to: receive, from a first information processing apparatus connected to the network, a first identifier assigned to the first information processing apparatus; receive, from a second information processing apparatus connected to the network, a second identifier assigned to the second information processing apparatus; determine whether a user of the first information processing apparatus coincides with a user of the second information processing apparatus based on the received first identifier and second identifier; and apply first settings to permit communication between the first information processing apparatus and the second information processing apparatus, upon determining that the user of the first information processing apparatus coincides with the user of the second information processing apparatus.

12 Claims, 17 Drawing Sheets

(56) References Cited

U.S. PATENT DOCUMENTS

2016/0205062 A1\* 7/2016 Mostert .............. H04L 61/1511
709/245
2017/0277906 A1\* 9/2017 Camenisch ......... G06F 21/6227

\* cited by examiner

| CUSTOMER | DSID | D-VID | NETWORK ADDRESS | C-VID | CSID | NETWORK SERVICE | SWITCH PORT |
|---|---|---|---|---|---|---|---|
| AA INC. | DC-XX-z0-000000 | 101 | 192.168.1.1 / 64 | 201 | SB-XX-z0-000000 | YY INC. | |
| BB INC. | ... | ... | ... | ... | ... | ... | ... |

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | - | 201 | 102 | SB-XX-z0-00000 | - | DC-XX-z0-00000 | - |

FIG.13B

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | - | 201 | 102 | SB-XX-z0-00000 | SB-XX-z0-00000 | DC-XX-z0-00000 | - |

FIG.13C

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | - | - | - | SB-XX-z0-00000 | SB-XX-z0-00000 | DC-XX-z0-00000 | - |

FIG.14A (4)

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | 101 | - | 102 | SB-XX-z0-00000 | SB-XX-z0-00000 | DC-XX-z0-00000 | - |

FIG.14B (5)

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | 101 | - | 102 | SB-XX-z0-00000 | SB-XX-z0-00000 | DC-XX-z0-00000 | DC-XX-z0-00000 |

FIG.14C (6)

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | - | - | - | SB-XX-z0-00000 | SB-XX-z0-00000 | DC-XX-z0-00000 | DC-XX-z0-00000 |

| CUSTOMER | D-VID | C-VID | VID OF MANAGEMENT SERVER | CSID | RESPONSE (CSID) | DSID | RESPONSE (DSID) |
|---|---|---|---|---|---|---|---|
| AA INC. | 101 | 201 | - | SB-XX-z0-00000 | SB-XX-z0-00000 | DC-XX-z0-00000 | DC-XX-z0-00000 |

| VID | VID | STATUS |
|---|---|---|
| 101 | 102 | INVALID |
| 102 | 201 | VALID |
| 101 | 201 | INVALID |

FIG.21A

| VID | VID | STATUS |
|---|---|---|
| 101 | 102 | VALID |
| 102 | 201 | INVALID |
| 101 | 201 | INVALID |

FIG.21B

| VID | VID | STATUS |
|---|---|---|
| 101 | 102 | INVALID |
| 102 | 201 | INVALID |
| 101 | 201 | VALID |

FIG.21C

ND SHARED
MANAGEMENT APPARATUS AND SHARED NETWORK SYSTEM

CROSS-REFERENCE TO RELATED APPLICATIONS

This application is based upon and claims the benefit of priority of the prior Japanese Patent Application No. 2016-176146, filed on Sep. 9, 2016, the entire contents of which are incorporated herein by reference.

FIELD

This invention relates to a technique for performing settings for communication in a shared network.

BACKGROUND

A data center provider provides closed area network service for convenience for customers who provide service such as housing in the data center. The closed area network service enables to connect to cloud service of the data center provider, cloud service and a data center of other providers, and the like.

In order to reduce service costs, a closed area network is sometimes shared by plural customers who use service. Hereinafter, a network shared by plural customers is referred to as a shared network. As a technique for preventing communication between servers of different customers in a shared network, some patent documents disclose using a VLAN (Virtual Local Area Network).

However, because settings for a VLAN in the closed area network as described above are complicated, it takes a lot of work to completely remove errors in the settings. In other words, there is no technique for preventing occurrence of errors in settings for communication between information processing apparatuses connected to a shared network.

Patent Document 1: Japanese Laid-open Patent Publication No. 2010-124162
Patent Document 2: Japanese Laid-open Patent Publication No. 2008-124791

SUMMARY

A management apparatus that manages communication in a network shared by information processing apparatuses of plural users, which relates to a first aspect of this embodiment, includes: a memory; and a processor coupled to the memory and configured to; receive, from a first information processing apparatus connected to the network, a first identifier assigned to the first information processing apparatus; receive, from a second information processing apparatus connected to the network, a second identifier assigned to the second information processing apparatus; determine whether a user of the first information processing apparatus coincides with a user of the second information processing apparatus based on the received first identifier and the received second identifier; and apply first settings to permit communication between the first information processing apparatus and the second information processing apparatus, upon determining that the user of the first information processing apparatus coincides with the user of the second information processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of data stored in a management data storage unit;
FIG. 13A is a diagram for explaining the settings for conversion of VIDs;
FIG. 13B is a diagram for explaining the settings for conversion of VIDs;
FIG. 13C is a diagram for explaining the settings for conversion of VIDs;
FIG. 14A is a diagram for explaining the settings for conversion of VIDs;
FIG. 14B is a diagram for explaining the settings for conversion of VIDs;
FIG. 14C is a diagram for explaining the settings for conversion of VIDs;
FIG. 15 is a diagram for explaining the settings for conversion of VIDs;
FIG. 21A is a diagram for explaining a fifth embodiment;

FIG. 21B is a diagram for explaining the fifth embodiment;

FIG. 21C is a diagram for explaining the fifth embodiment; and

DESCRIPTION OF EMBODIMENTS

Embodiment 1

Figure 1:
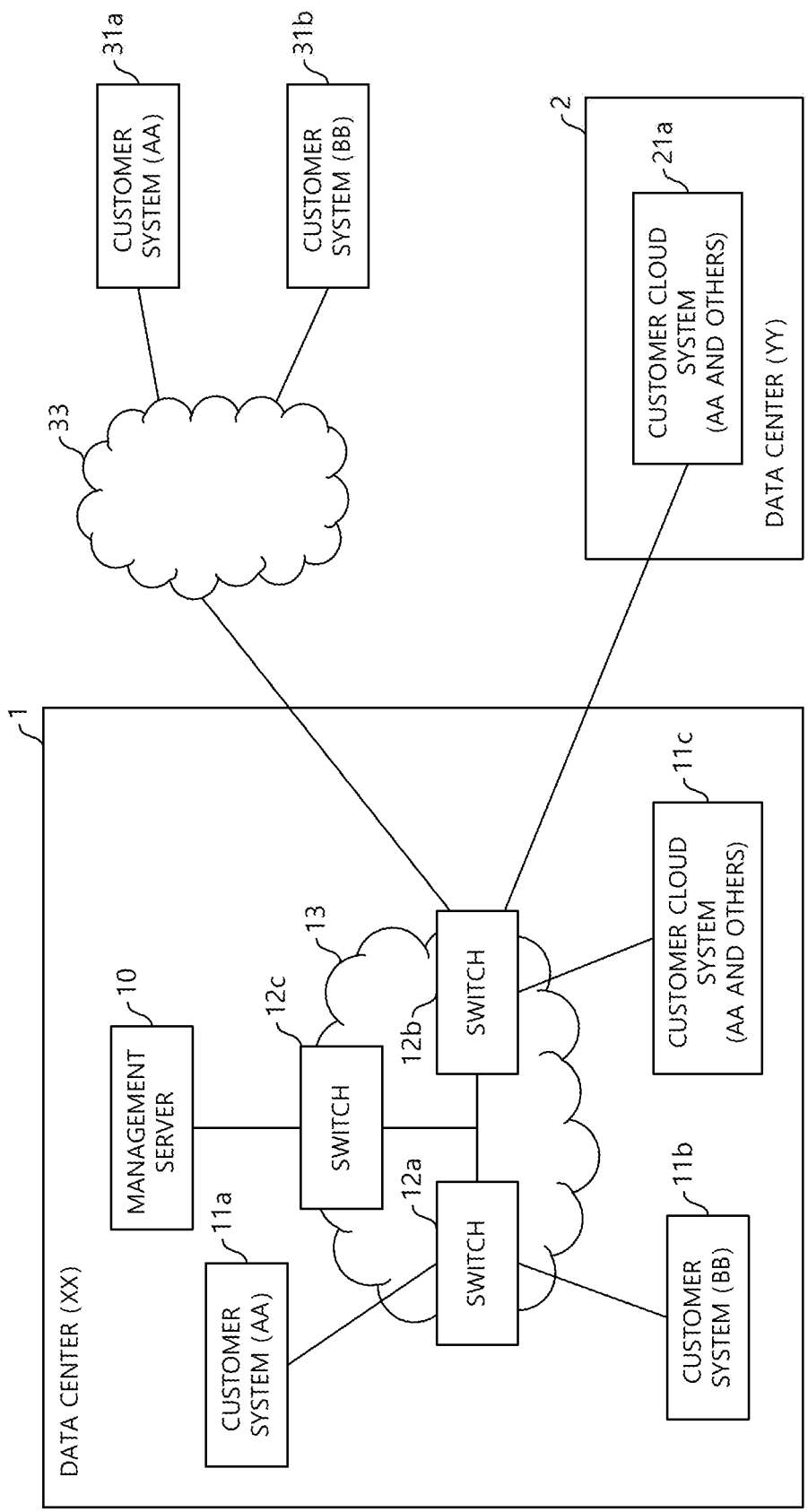
FIG. 1 is a diagram depicting a network configuration of a first embodiment.

FIG. 1 illustrates a network configuration of a first embodiment. A data center 1 is operated by XX inc., which is a data center provider. In the data center 1, a management server 10, a customer system 11a which is a system of AA inc., a customer system 11b which is a system of BB inc., and a customer cloud system 11c used for plural customers are arranged. In the customer cloud system 11c, hardware resources are shared by plural customers, but each customer system operates logically independently as a different system. In the example of FIG. 1, the customer cloud system 11c includes a system of AA inc. and systems of other corporations. In the data center 1, a closed area network 13 is constructed, and switches 12a to 12c relay communication data in the closed area network 13. The management server 10 is physically connected to the switch 12c by a communication cable, the customer system 11a and the customer system 11b are physically connected to the switch 12a by a communication cable, and the customer cloud system 11c is physically connected to the switch 12b by a communication cable. The customer is, for example, an individual, a corporation, a group or the like.

The data center 2 that is operated by the data center provider YY inc. is connected to the switch 12b by, for example, a dedicated line. In the data center 2, a customer cloud system 21a used by plural customers is arranged. In the customer cloud system 21a, hardware resources are shared by plural customers, but each customer system operates logically independently as a different system. In the example of FIG. 1, the customer cloud system 21a includes a system of AA inc. and systems of other corporations.

A closed area network 33 is provided by YY inc. and is connected to switch 12b. The closed area network 33 is connected to a customer system 31a which is a system of AA inc. and a customer system 31b which is a system of BB inc.

The closed area networks 13 and 33 are shared networks and may be realized as shared bus systems, for example.

Figure 2:
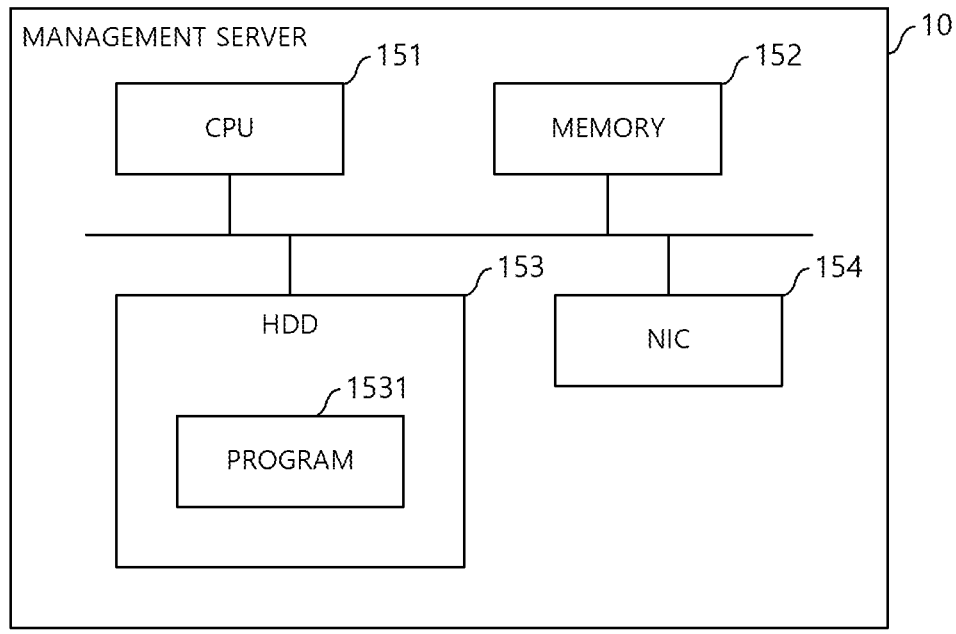
FIG. 2 is a diagram depicting a hardware configuration of a management server.

FIG. 2 illustrates a hardware configuration of the management server 10. The management server 10 has a CPU (Central Processing Unit) 151, a memory 152 which is, for example, a RAM (Random Access Memory), a HDD (Hard Disk Drive) 153, and an NIC (Network Interface Card) 154 having one or more physical ports. The HDD 153 stores a program 1531 for processing in this embodiment, and each type of functions illustrated in FIG. 3 is enabled by loading the program 1531 in the memory 152 and executing the program 1531 by the CPU 151.

Figure 3:
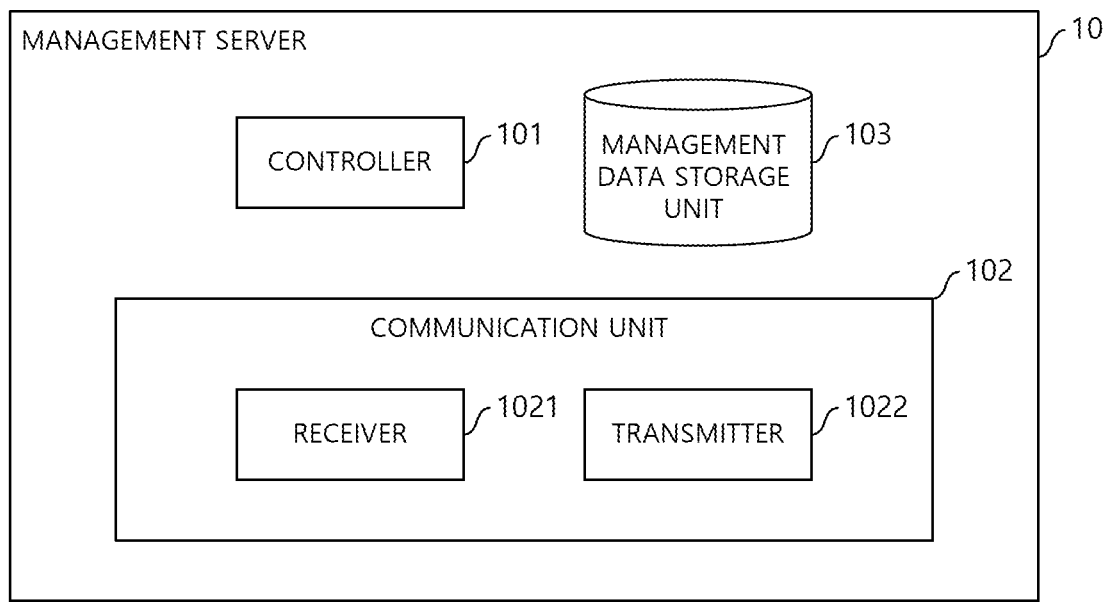
FIG. 3 is a functional block diagram of the management server.

FIG. 3 illustrates a functional block diagram of the management server 10. The management server 10 has a controller 101, a communication unit 102, and a management data storage unit 103. The communication unit 102 includes a receiver 1021 and a transmitter 1022. The management data storage unit 103 is provided, for example, in the HDD 153.

The controller 101 executes processing to determine whether communication is permitted, processing to set switches 12a to 12c, and the like. The receiver 1021 executes processing to receive data from a physical server 110 in other customer systems and other customer cloud systems. The transmitter 1022 executes processing to transmit data to the physical server 110 in other customer system and other customer cloud system.

Figure 4:
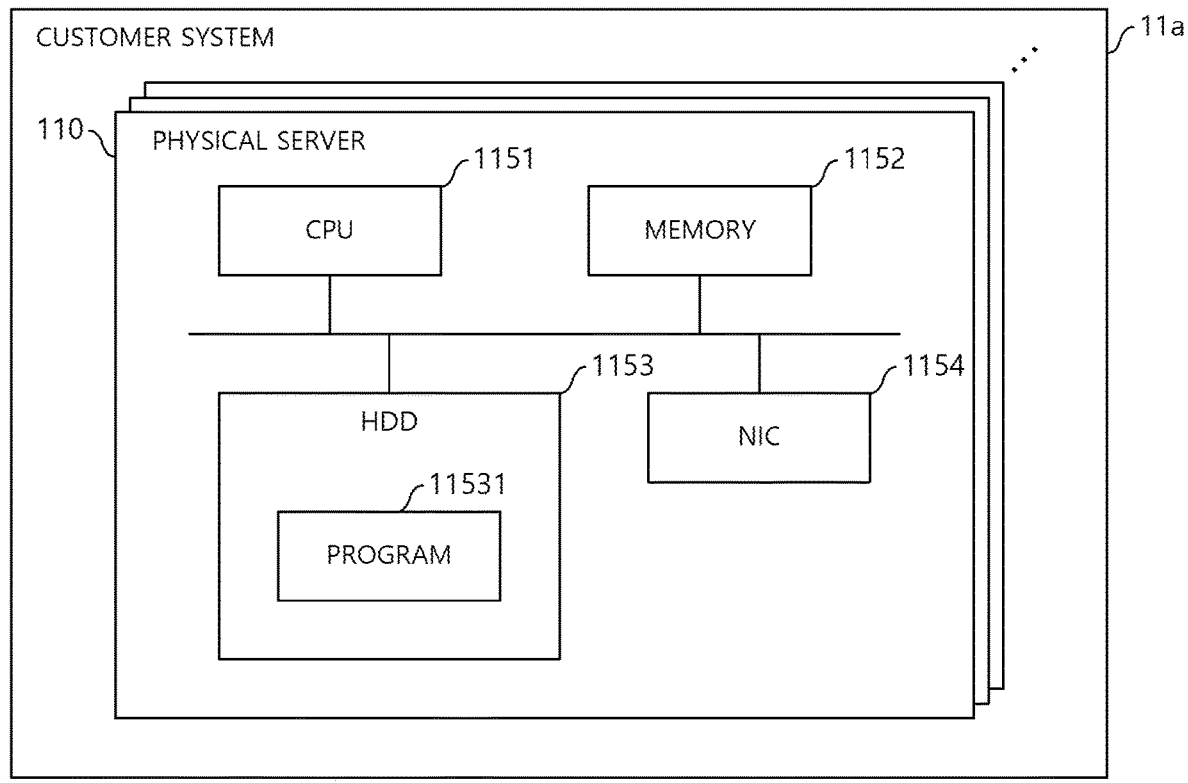
FIG. 4 is a diagram depicting a hardware configuration of a physical server.

The customer system 11a has one or more physical servers 110. FIG. 4 illustrates a hardware configuration of the physical server 110. The physical server 110 has a CPU 1151, a memory 1152 which is, for example, a RAM, a HDD 1153, and a NIC 1154 having one or more physical ports. The HDD 1153 stores a program 11531 for processing in this embodiment, and each type of functions illustrated in FIG. 5 is enabled by loading the program 11531 in the memory 1152 and executing the program 11531 by the CPU 1151.

Figure 5:
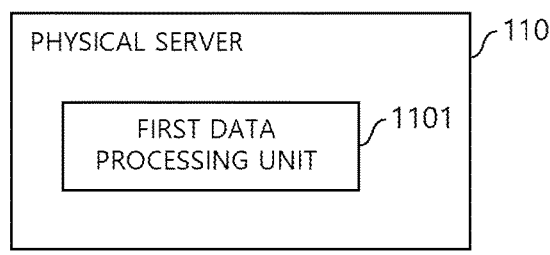
FIG. 5 is a diagram depicting a functional block diagram of the physical server in the first embodiment.

FIG. 5 illustrates a functional block diagram of the physical server 110. The physical server 110 has a first data processing unit 1101. The first data processing unit 1101 executes processing to transmit data to the management server 10 in response to a command issued from the management server 10.

Customer systems other than the customer system 11a and customer cloud systems also have one or more physical servers. A physical server other than the physical server 110 has the same hardware configuration and functional block configuration as the physical server 110.

In this embodiment, it is considered to realize communication among systems that are used by the same customer and have different VLAN IDs (IDentifiers) (hereinafter, referred to as VIDs). For example, the communication is communication between the customer system 11a and the customer cloud system 11c, and communication between the customer system 11a and the customer cloud system 21a. Setting to realize such communication is performed for the switches 12a to 12c which relay the communication.

Figure 6:
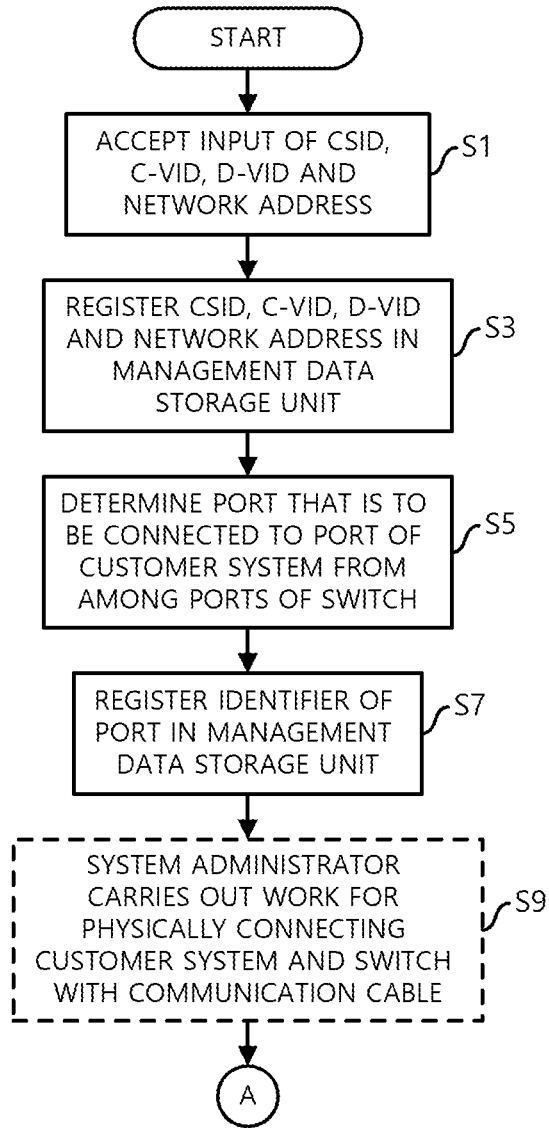
FIG. 6 is a diagram depicting a processing flow of processing executed by the management server in the first embodiment.

First, with reference to FIGS. 6 to 9, processing executed by the management server 10 will be explained. For example, it is assumed that a certain customer (in the following, referred to as a target customer) requests to connect a customer system (in the following, referred to as the customer system 11a) to a switch (in the following, referred to as the switch 12a) physically with a communication cable, and to enable communication between the customer system 11a and a customer cloud system (in the following, referred to as the customer cloud system 21a). In this case, the controller 101 of the management server 10 accepts, from a system administrator of the target customer, an input of a cloud service ID (hereinafter, referred to as a CSID) assigned to the target customer, a VID used for communication of the customer cloud system 21a (hereinafter, referred to as a C-VID), a VID used for communication of the customer system 11a (hereinafter, referred to as a D-VID), and a network address of the target customer (FIG. 6: step S1). The CSID is an ID assigned to a customer using cloud service.

The controller 101 registers the CSID, the C-VID, the D-VID and the network address that has been inputted in step S1 in the management data storage unit 103 (step S3). In addition, the controller 101 registers a data center service ID (hereinafter, referred to as a DSID) which was assigned in advance to the target customer in the management data storage unit 103.

FIG. 7 illustrates an example of data stored in the management data storage unit 103. In the example of FIG. 7, a customer name, a DSID, a D-VID, a network address, a C-VID, a CSID, a name of a provider that provides closed area network service to the target customer, and a name of a switch port are stored. The name of the provider that provides the closed area network service to the target customer is a name of a provider of a data center different from the data center 1 where the management server 10 is arranged, and it is set as NULL when the target customer is not using it. The name of the switch port is a name of a port connected to the customer system 11*a* via a communication cable, and is set as NULL at the time of step S3.

The controller 101 determines, from among ports of the switch 12*a*, a port of the switch 12*a* newly connected with the customer system 11*a* with a communication cable (step S5). In step S5, it is determined randomly or in accordance with predetermined criteria from available ports.

The controller 101 registers an identifier of the port determined in the processing of step S5 in the same record as the record in which the data has been registered in step S3, among records in the management data storage unit 103 (step S7).

After that, the system administrator of the customer system 11*a* carries out a work for physically connecting the customer system 11*a* and the switch 12*a* with a communication cable (step S9). Because step S9 is not processing executed by the management server 10, a block of step S9 in FIG. 6 is represented by a broken line. Then, the processing shifts to step S11 of FIG. 8 through terminal A.

Figure 8:
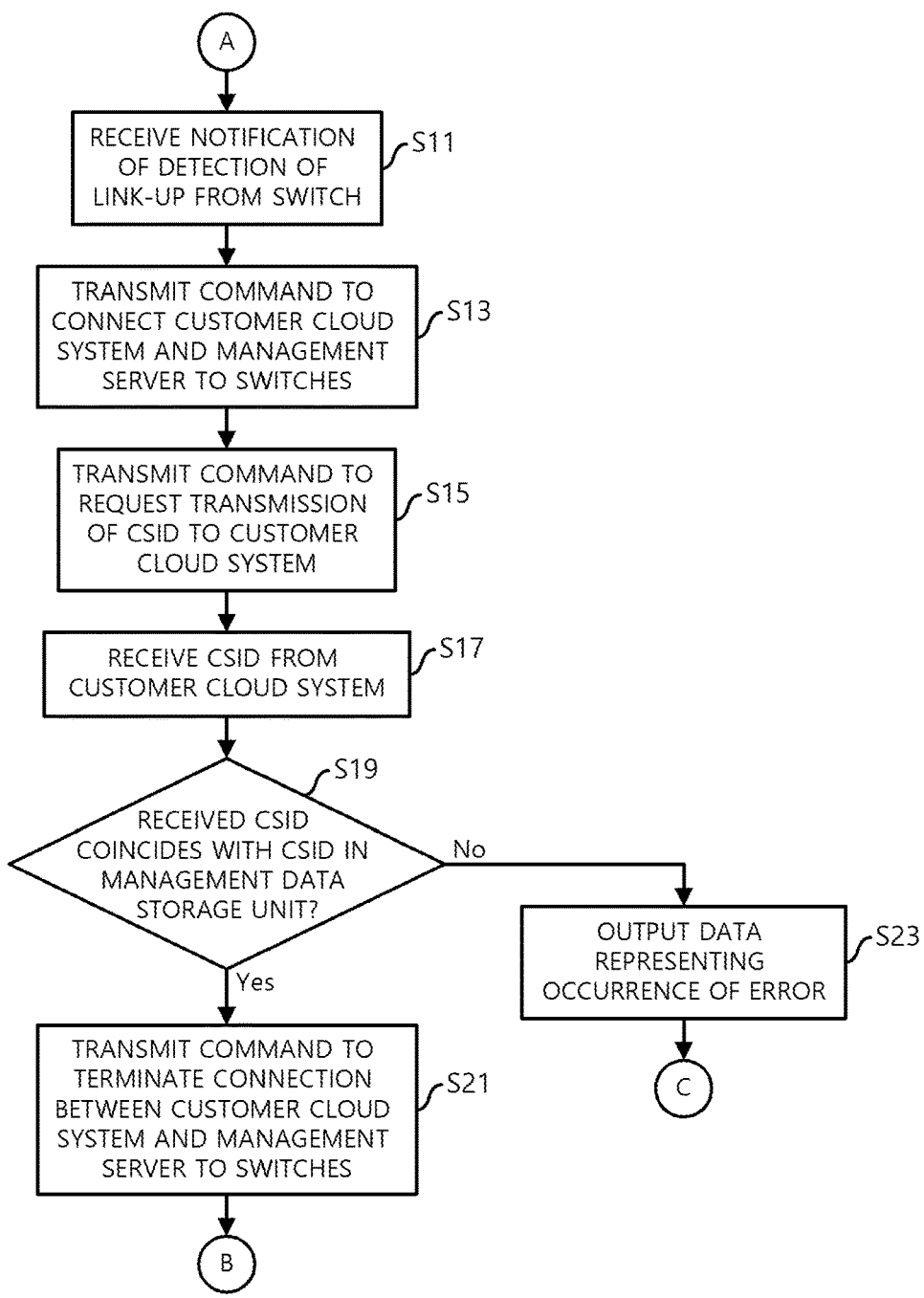
FIG. 8 is a diagram depicting a processing flow of processing executed by the management server in the first embodiment.

Shifting to the explanation of FIG. 8, the receiver 1021 receives, from the switch 12*a*, a notification of detection of link-up in the switch 12*a* as a result of physically connecting the customer system 11*a* and the switch 12*a* with a communication cable (FIG. 8: step S11).

The controller 101 generates a command to connect the customer cloud system 21*a* and the management server 10. Then, the transmitter 1022 transmits the generated command to switches (for example, switch 12*b* and switch 12*c*) relaying communication data between the customer cloud system 21*a* and the management server 10 (step S13). In response to this, the switches perform settings for conversion of VIDs. Although the VID used by the management server 10 and the VID used by the customer cloud system 21*a* are different, by the conversion settings for VIDs, it becomes possible to communicate between the customer cloud system 21*a* and the management server 10.

The transmitter 1022 generates a command to request transmission of a CSID. Then, the transmitter 1022 transmits the generated command to the customer cloud system 21*a* (step S15).

After that, the receiver 1021 receives the CSID assigned to the customer cloud system 21*a* from the customer cloud system 21*a* (step S17).

The controller 101 determines whether the CSID received in step S17 is the same as a CSID included in the record for the target customer, among CSIDs stored in the management data storage unit 103 (step S19).

When the CSID received in step S17 is the same as the CSID included in the record for the target customer, among CSIDs stored in the management data storage unit 103 (step S19: Yes route), the following processing is executed. Specifically, the controller 101 generates a command to terminate the connection between the customer cloud system 21*a* and the management server 10. Then, the transmitter 1022 transmits the generated command to the switches (for example, switch 12*b* and switch 12*c*) relaying communication data between the customer cloud system 21*a* and the management server 10 (step S21). In response to this, the switches delete the conversion settings for VIDs. Then, the processing shifts to step S25 of FIG. 9 via terminal B.

On the other hand, when the CSID received in step S17 is not the same as the CSID included in the record for the target customer among CSIDs stored in the management data storage unit 103 (step S19: No route), the following processing is executed. Specifically, the controller 101 outputs data representing that an error has occurred (step S23). In step S23, for example, data is displayed on a display device of the management server 10 or data is transmitted to a terminal of the system administrator. Then, the processing shifts to FIG. 9 via terminal C and the processing ends.

Figure 9:
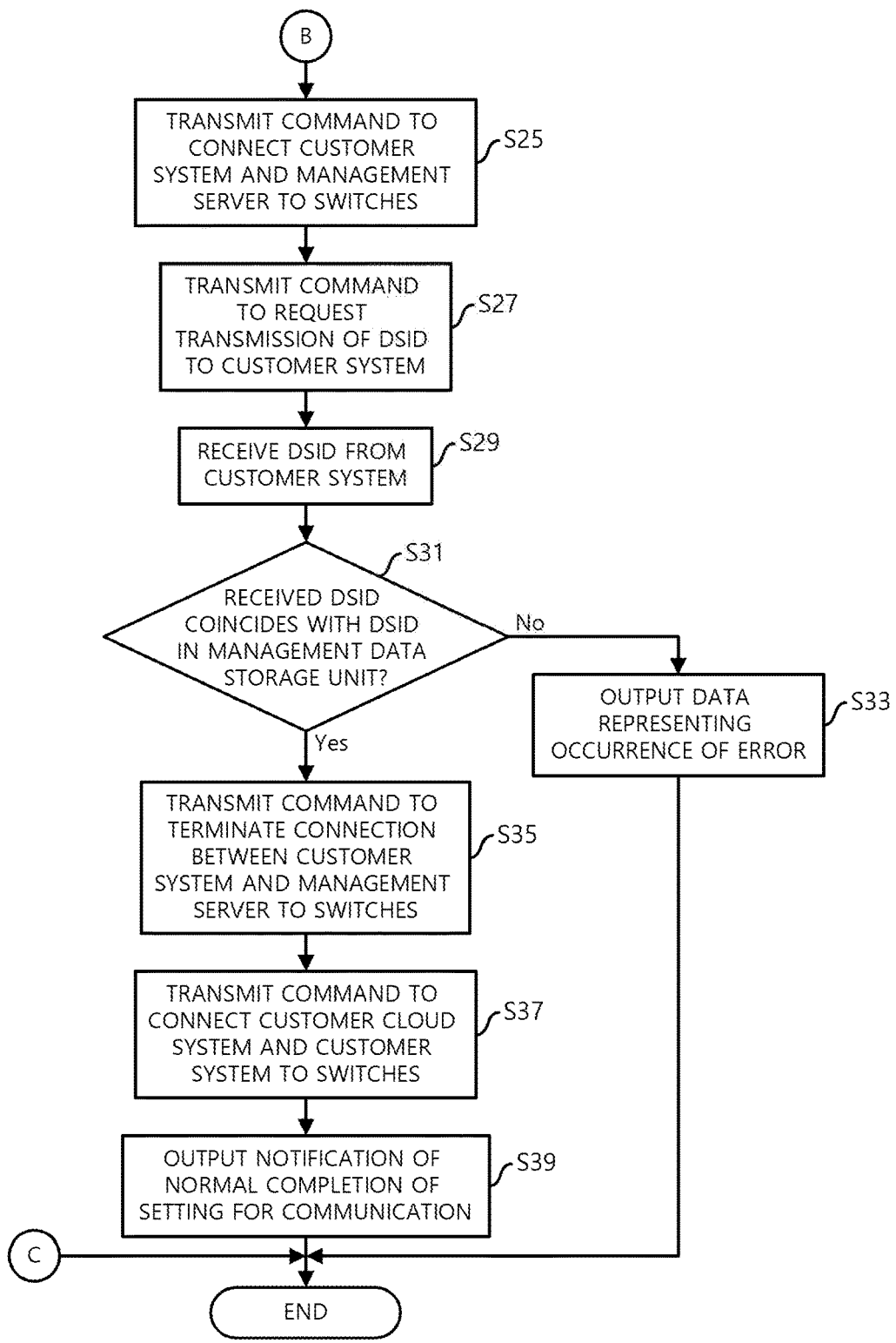
FIG. 9 is a diagram depicting the processing flow of processing executed by the management server in the first embodiment.

Returning to the explanation of FIG. 9, the controller 101 generates a command to connect the customer system 11*a* and the management server 10. Then, the transmitter 1022 transmits the generated command to switches (for example, switch 12*a* and switch 12*c*) relaying communication data between the customer system 11*a* and the management server 10 (FIG. 9: step S25). In response to this, the switches perform setting for conversion of VIDs. Although the VID used by the management server 10 and the VID used by the customer system 11*a* are different, by the conversion settings for VIDs, the customer system 11*a* and the management server 10 can communicate.

The transmitter 1022 generates a command to request transmission of a DSID. Then, the transmitter 1022 transmits the generated command to the customer system 11*a* (step S27).

After that, the receiver 1021 receives the DSID assigned to the customer system 11*a* from the customer system 11*a* (step S29).

The controller 101 determines whether the DSID received in step S29 is the same as a DSID included in the record for the target customer, among DSIDs stored in the management data storage unit 103 (step S31).

When the DSID received in step S29 is not the same as the DSID included in the record for the target customer among DSIDs stored in the management data storage unit 103 (step S31: No route), the following processing is executed. Specifically, the controller 101 outputs data representing that an error has occurred (step S33). In step S33, for example, data is displayed on the display device of the management server 10 or data is transmitted to the terminal of the system administrator. Then, the processing ends.

On the other hand, when the DSID received in step S29 is the same as the DSID included in the record for the target customer among DSIDs stored in the management data storage unit 103 (step S31: Yes route), the following processing is performed. Specifically, the controller 101 generates a command to terminate the connection between the customer system 11*a* and the management server 10. Then, the transmitter 1022 transmits the generated command to the switches (for example, the switch 12*a* and the switch 12*c*) relaying the communication data between the customer system 11*a* and the management server 10 (step S35). In response to this, the switches delete the conversion settings for VIDs.

The controller 101 generates a command to connect the customer system 11*a* and the customer cloud system 21*a*. Then, the transmitter 1022 transmits the generated command to switches (for example, the switch 12*a* and the switch 12*b*) relaying the communication data between the customer system 11*a* and the customer cloud system 21*a* (step S37). In response to this, the switches perform settings for conversion of VIDs. Although the VID used by the customer system 11*a* is different from the VID used by the customer cloud system 21*a*, by the conversion settings for VIDs, the customer system 11*a* and the customer cloud system 21*a* can communicate. In addition, the switches may perform other setting (for example, setting for communication speeds and setting for redundancy of links).

The controller 101 outputs data representing that setting for communication is normally completed (step S39). In step S39, for example, data is displayed on the display device of the management server 10 or data is transmitted to the terminal of the system administrator. Then, the processing ends.

As described above, the customer system 11a and the customer cloud system 21a cannot communicate with each other unless it is confirmed that the customers are the same by matching of end points of the communication. Therefore, it becomes possible to prevent erroneous settings such as settings for communication between systems of different customers. As a result, unauthorized access is prevented, and it becomes possible to raise a security level of the closed area network 13.

In addition, it becomes possible to notify an administrator of the data center provider before actual communication is started when an error has occurred.

Moreover, according to this embodiment, check of communication settings is not entrusted to a customer, and the administrator of the data center provider is able to check whether there is any error in the communication settings.

Figure 10:
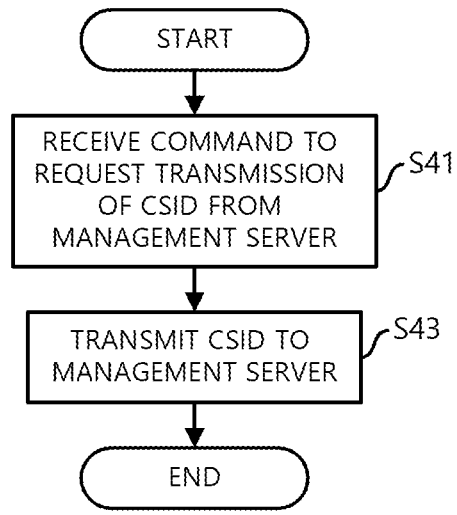
FIG. 10 is a diagram depicting a processing flow of processing executed by the physical server in the first embodiment when receiving a command to request transmission of a CSID.

With reference to FIG. 10, processing executed when the physical server 110 receives a command to request transmission of a CSID will be explained. The first data processing unit 1101 of the physical server 110 receives a command to request transmission of a CSID from the management server 10 (FIG. 10: step S41).

The first data processing unit 1101 reads out the CSID stored in advance in the HDD 1153 or the like. Then, the first data processing unit 1101 transmits the read out CSID to the management server 10 (step S43). Then, the processing ends.

Figure 11:
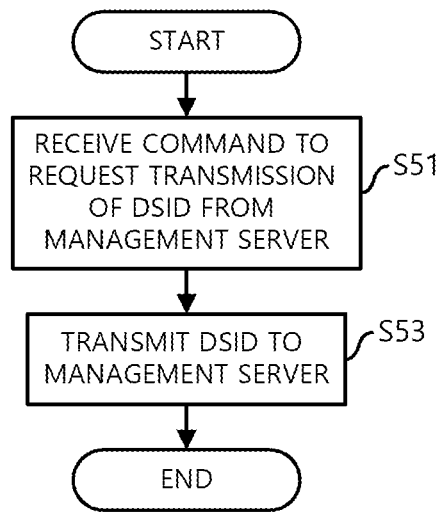
FIG. 11 is a diagram depicting the processing flow of processing executed by the physical server in the first embodiment when receiving the command to request transmission of a DSID.

With reference to FIG. 11, processing executed when the physical server 110 receives a command to request transmission of a DSID will be explained. The first data processing unit 1101 of the physical server 110 receives a command to request transmission of a DSID from the management server 10 (FIG. 11: step S51).

The first data processing unit 1101 reads out the DSID stored in advance in the HDD 1153 or the like. Then, the first data processing unit 1101 transmits the read out DSID to the management server 10 (step S53). Then, the processing ends.

By the aforementioned processing, the management server 10 can obtain the CSID and the DSID, from the physical server 110 that is a connection source and the physical server 110 that is a connection destination.

Figure 12:
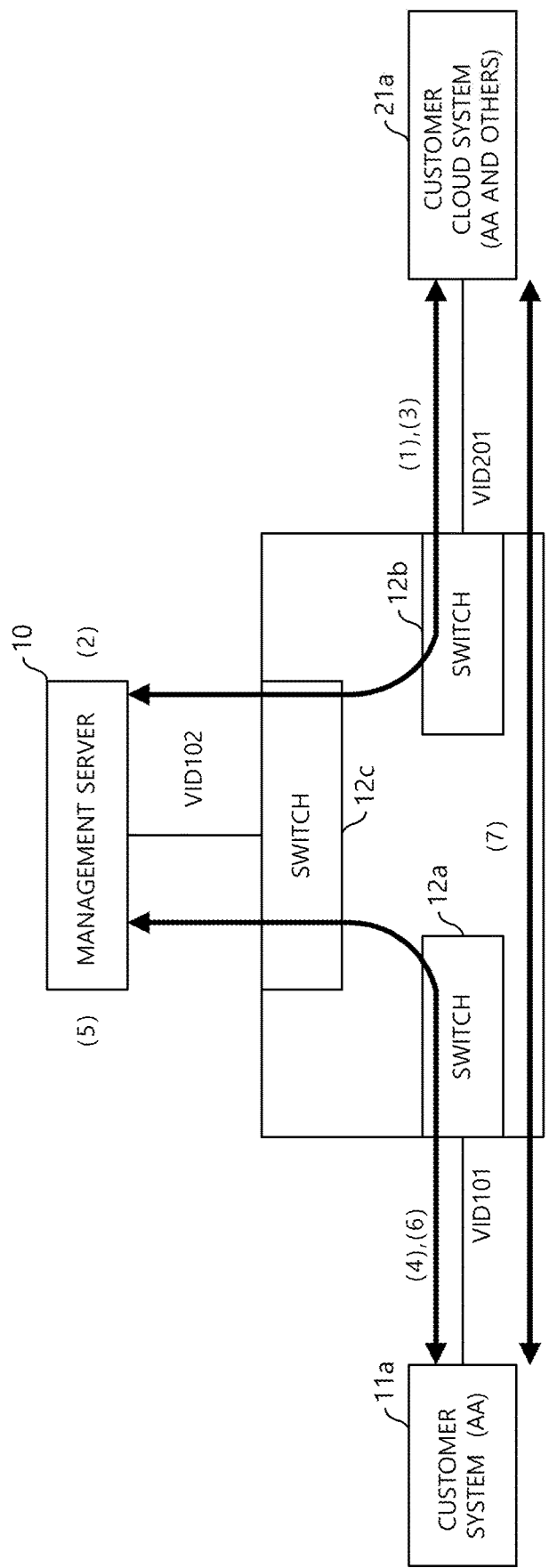
FIG. 12 is a diagram for explaining settings for conversion of VIDs.

With reference to FIGS. 12 to 15, an explanation is added regarding the conversion settings for VIDs. In FIG. 12, a number in a parenthesis corresponds to a number in a parenthesis in FIGS. 13A to 15. As illustrated in FIG. 12, an example is explained in which the management server 10 using VID "102" executes when realizing communication between the customer system 11a using VID "101" and the customer cloud system 21a using VID "201".

The management server 10 issues a command to connect the customer cloud system 21a and the management server 10 to switches related to that connection. As a result, conversion between VID "102" and VID "201" is executed on the switches, and the customer cloud system 21a and the management server 10 can communicate with each other. This processing corresponds to FIG. 13A.

When a CSID received from the customer cloud system 21a is the same as a CSID registered in advance in the management server 10, authentication on one side is completed. This processing corresponds to FIG. 13B.

The management server 10 issues a command to terminate the connection between the customer cloud system 21a and the management server 10 to the switches related to the connection. As a result, conversion between VID "102" and VID "201" is no longer executed on the switches, and the customer cloud system 21a and the management server 10 cannot communicate. This processing corresponds to FIG. 13C.

The management server 10 issues a command to connect the customer system 11a and the management server 10 to switches related to that connection. As a result, the conversion between VID "101" and VID "102" is executed on the switches, and the customer system 11a and the management server 10 can communicate with each other. This processing corresponds to FIG. 14A.

When a DSID received from the customer system 11a is the same as a DSID registered in advance in the management server 10, authentication on the other side is completed. This processing corresponds to FIG. 14B.

The management server 10 issues a command to terminate the connection between the customer system 11a and the management server 10 to the switches related to the connection. As a result, conversion between VID "101" and VID "102" is no longer executed on the switches, and the customer system 11a and the management server 10 cannot communicate. This processing corresponds to FIG. 14C.

The management server 10 issues a command to connect the customer system 11a and the customer cloud system 21a to switches related to that connection. As a result, conversion between VID "101" and VID "201" is executed on the switches, and the customer system 11a and the customer cloud system 21a can communicate. This processing corresponds to FIG. 15.

Embodiment 2

In the first embodiment, when the management server 10 issues a command to request transmission of a CSID and a command to request transmission of a DSID, the customer system 11a transmits the DSID and the customer cloud system 21a transmits the CSID. On the other hand, in a second embodiment, even though the commands are not issued from the management server 10, the customer system 11a autonomously transmits the DSID and the customer cloud system 21a autonomously transmits the CSID.

Figure 16:
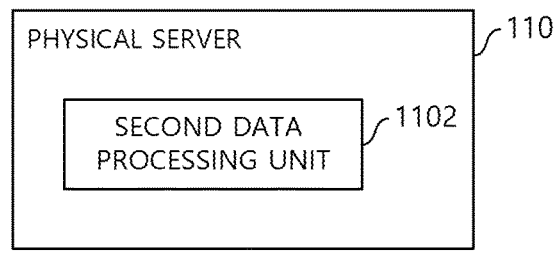
FIG. 16 is a functional block diagram of the physical server in a second embodiment.

FIG. 16 is a functional block diagram of the physical server 110 in the second embodiment. The physical server 110 has a second data processing unit 1102. The second data processing unit 1102 executes processing to transmit data to the management server 10 at a predetermined timing or in response to an input from a system administrator.

Figure 17:
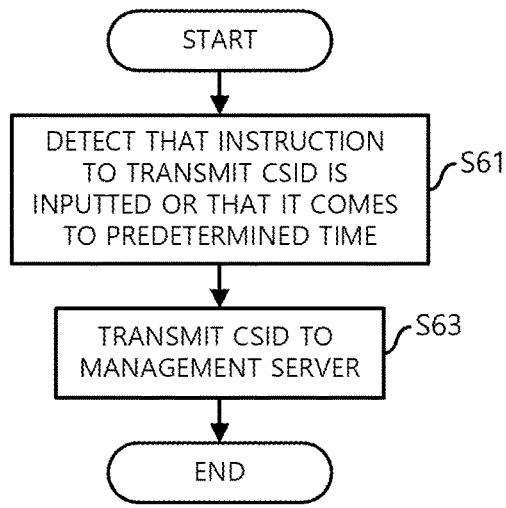
FIG. 17 is a diagram depicting a processing flow of processing to transmit a CSID, which is executed by the physical server in the second embodiment.
Figure 18:
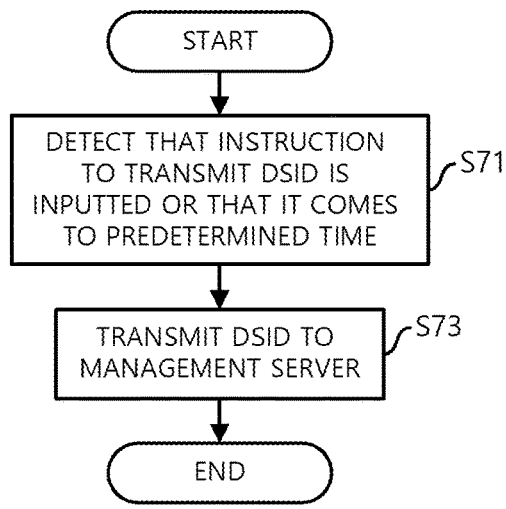
FIG. 18 is a diagram depicting the processing flow of processing to transmit a DSID, which is executed by the physical server in the second embodiment.

With reference to FIGS. 17 and 18, processing executed by the physical server 110 in the second embodiment will be explained. First, with reference to FIG. 17, processing in which the physical server 110 transmits a CSID will be explained. The second data processing unit 1102 of the physical server 110 detects that an instruction to transmit CSID is inputted from the system administrator or it comes to a predetermined time (FIG. 17: step S61).

The second data processing unit 1102 reads out a CSID stored in advance in the HDD 1153 or the like. Then, the second data processing unit 1102 transmits the read out CSID to the management server 10 (step S63). Then, the processing ends.

With reference to FIG. 18, processing in which the physical server 110 transmits a DSID will be explained. The second data processing unit 1102 of the physical server 110 detects that the transmission instruction of the DSID is inputted from the system administrator or that it comes to the predetermined time (FIG. 18: step S71).

The second data processing unit 1102 reads out a DSID stored in advance in the HDD 1153 or the like. Then, the second data processing unit 1102 transmits the read out DSID to the management server 10 (step S73). Then, the processing ends.

By executing the aforementioned processing, it becomes possible to notify the management server 10 of the CSID and DSID even when the customer does not like commands to be transmitted from the management server 10.

Embodiment 3

In the third embodiment, commands of the layer 7 (that is, the application layer) are issued from the management server 10 to the customer system 11a and the customer cloud system 21a. On the other hand, in a third embodiment, commands of the layer 2 are issued from the management server 10 to the customer system 11a and the customer cloud system 21a.

Figure 19:
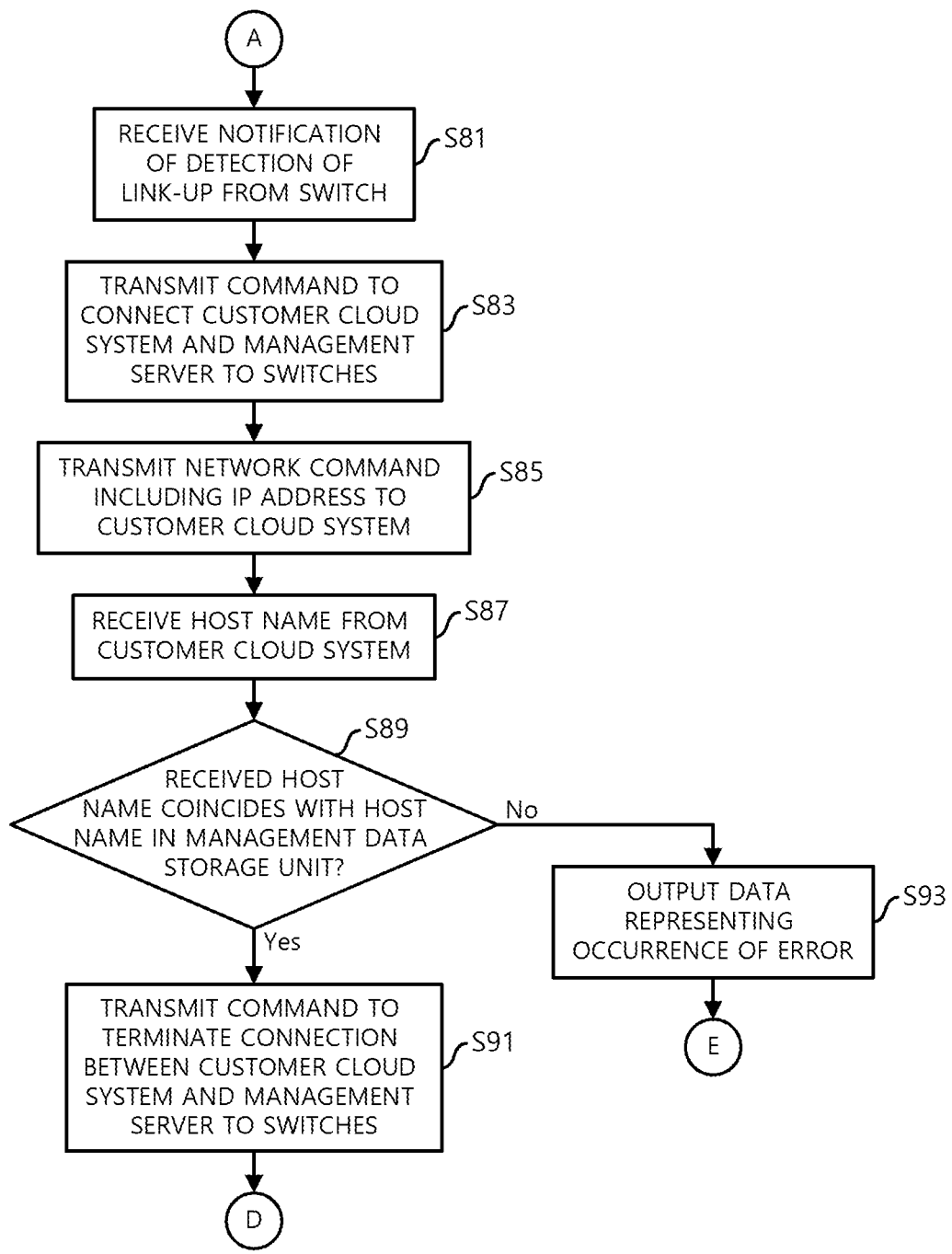
FIG. 19 is a diagram depicting a processing flow of processing executed by the management server in a third embodiment.
Figure 20:
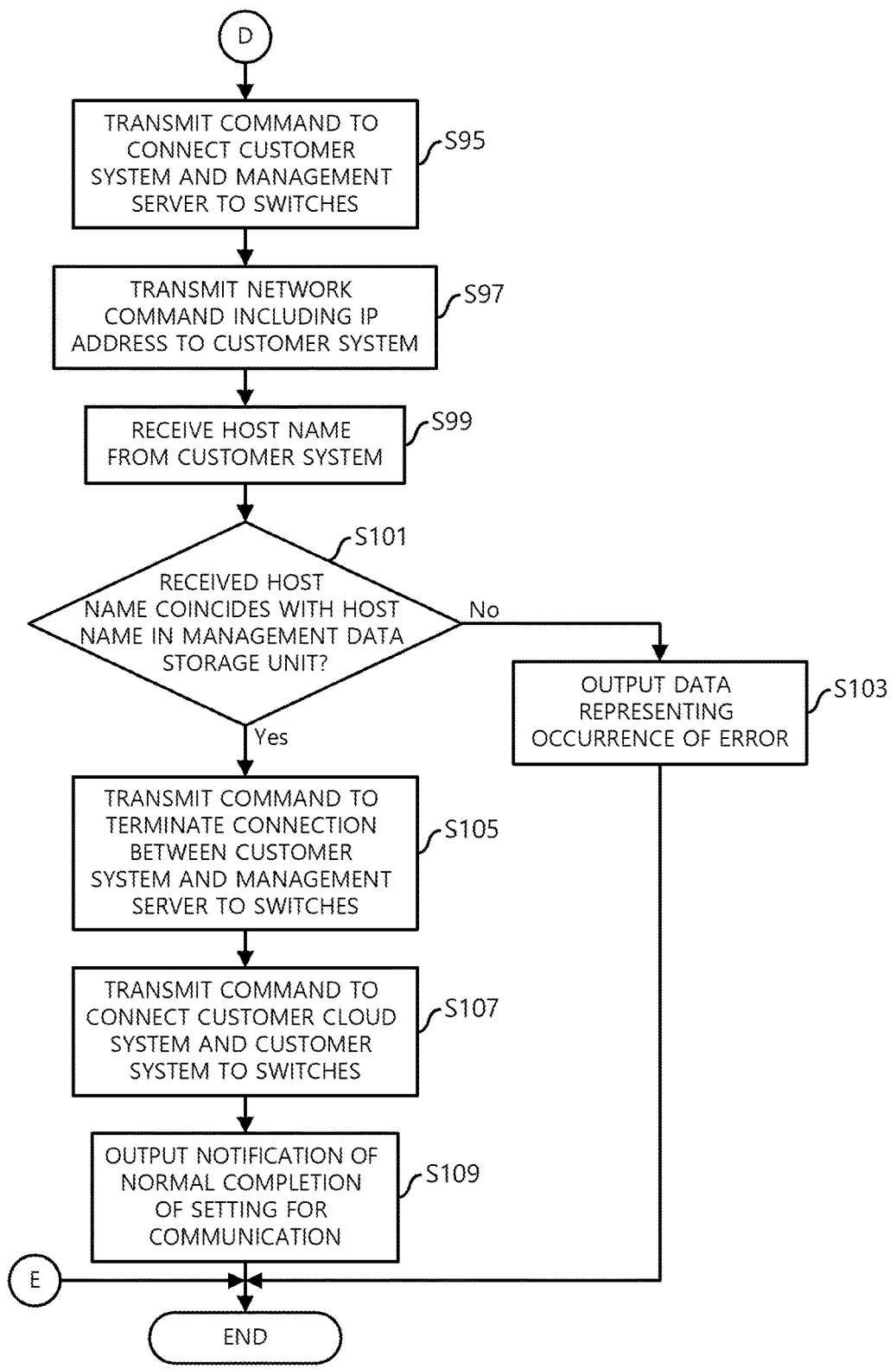
FIG. 20 is a diagram depicting the processing flow of processing executed by the management server in the third embodiment.

With reference to FIGS. 19 and 20, processing executed by the management server 10 in the third embodiment will be explained. However, since the processing up to terminal A is the same as in the first embodiment, the processing after terminal A will be explained.

The receiver 1021 of the management server 10 receives a notification from the switch 12a that link-up has been detected in the switch 12a as a result of physically connecting the customer system 11a and the switch 12a with a communication cable (FIG. 19: step S81).

The controller 101 generates a command to connect the customer cloud system. 21a and the management server 10. Then, the transmitter 1022 transmits the generated command to switches (for example, switch 12b and switch 12c) relaying communication data between the customer cloud system 21a and the management server 10 (step S83). In response to this, the switches perform settings for conversion of VIDs. Although the VID used by the management server 10 and the VID used by the customer cloud system. 21a are different, by the conversion settings for VIDs, the customer cloud system 21a and the management server 10 can communicate.

The transmitter 1022 generates a network command (for example, host command) including an IP (Internet Protocol) address. Then, the transmitter 1022 transmits the generated command to the customer cloud system 21a (step S85).

After that, the receiver 1021 receives a host name of one of physical servers 110 in the customer cloud system 21a from the customer cloud system 21a (step S87). However, it is not limited to the host name, and it may be other information (for example, an IP address or a combination of an IP address and a host name) that can be used in checking a connection destination.

The controller 101 determines whether the host name received in step S87 is the same as a host name included in a record for the target customer, among host names stored in the management data storage unit 103 (step S89).

When the host name received in step S87 is the same as the host name stored in the record for the target customer among host names stored in the management data storage unit 103 (step S89: Yes route), the following processing is executed. Specifically, the controller 101 generates a command to terminate the connection between the customer cloud system 21a and the management server 10. Then, the transmitter 1022 transmits the generated command to the switches (for example, switch 12b and switch 12c) relaying the communication data between the customer cloud system 21a and the management server 10 (step S91). In response to this, the switch deletes the conversion settings for VIDs. Then, the processing shifts to step S95 of FIG. 20 via terminal D.

On the other hand, when the host name received in step S87 is not the same as the host name stored in the record for the target customer among host names stored in the management data storage unit 103 (step S89: No route), the following processing is executed. Specifically, the controller 101 outputs data representing that an error has occurred (step S93). In step S93, for example, data is displayed on the display device of the management server 10 or data is transmitted to the terminal of the system administrator. Then, the processing shifts to FIG. 20 via terminal E, and the processing ends.

Shifting to the description of FIG. 20, the controller 101 generates a command to connect the customer system 11a and the management server 10. Then, the transmitter 1022 transmits the generated command to switches (for example, switch 12a and switch 12c) relaying communication data between the customer system 11a and the management server 10 (FIG. 20: step S95). In response to this, the switches perform settings for conversion of VIDs. The VID used by the management server 10 and the VID used by the customer system 11a are different, but according to the conversion settings for VIDs, the customer system 11a and the management server 10 can communicate.

The transmitter 1022 generates a network command (for example, a host command) including an IP address. Then, the transmitter 1022 transmits the generated command to the customer system 11a (step S97).

Thereafter, the receiver 1021 receives a host name of one of physical servers 110 in the customer system 11a from the customer system 11a (step S99). However, it is not limited to the host name, and it may be other information (for example, a combination of an IP address or an IP address and a host name) that can be used in checking a connection destination.

The controller 101 determines whether the host name received in step S99 is the same as the host name included in the record for the target customer among host names stored in the management data storage unit 103 (step S101).

When the host name received in step S99 is not the same as the host name contained in the record for the target customer among the host names stored in the management data storage unit 103 (step S101: No route), the following processing is executed. Specifically, the controller 101 outputs data representing that an error has occurred (step S103). In step S103, for example, data is displayed on the display device of the management server 10 or data is transmitted to the terminal of the system administrator. Then, the processing ends.

On the other hand, if the host name received in step S99 is the same as the host name contained in the record for the target customer among host names stored in the management data storage unit 103 (step S101: Yes route), the following processing is executed. Specifically, the controller 101 generates a command to terminate the connection between the customer system 11a and the management server 10. Then, the transmitter 1022 transmits the generated command to the switches (for example, the switch 12a and the switch 12c) relaying the communication data between the customer system 11a and the management server 10 (step S105). In response to this, the switches delete the conversion settings for VIDs.

The controller 101 generates a command to connect the customer system 11a and the customer cloud system 21a. Then, the transmitter 1022 transmits the generated command to switches (for example, the switch 12a and the switch 12b) relaying the communication data between the customer system 11a and the customer cloud system 21a (step S107). In response to this, the switches perform settings for conversion of VIDs. Although the VID used by the customer system 11a is different from the VID used by the customer cloud system 21a, by the conversion settings for VIDs, the customer system 11a and the customer cloud system 21a can communicate. In addition, the switches may perform other setting (for example, setting for communication speeds and setting for redundancy of links).

The controller 101 outputs data representing that setting for communication is normally completed (step S109). In step S109, for example, data is displayed on the display device of the management server 10 or data is transmitted to the terminal of the system administrator. Then, the processing ends.

As described above, it becomes possible to perform setting for communication even in the case of using commands of the layer 2.

Embodiment 4

In the first to third embodiments, conversion of VIDs is executed in the switches 12a to 12c. However, the management server 10 communicates with the customer system 11a and the customer cloud system 21a by a method other than the conversion of VIDs. For example, communication data with VID "201" is outputted to a port to which the management server 10 is connected and communication data with VID "102" is outputted to a port to which the customer cloud system 21a is connected, while communication between the management server 10 and the customer cloud system 21a is performed. In addition, communication data with VID "101" is outputted to a port to which the management server 10 is connected and communication data with VID "102" is outputted to a port to which the customer system 11a is connected, while communication between the management server 10 and the customer system 11a is performed. In this way, the management server 10 is able to communicate with the customer system 11a and the customer cloud system 21a without converting VIDs.

Embodiment 5

In the first to third embodiments, a command to change settings is issued at the time of establishing the connection and at the time of terminating the connection. However, settings are generated in advance in the switches and each setting is validated or invalidated to control communication.

For example, as illustrated in FIG. 21A, while the management server 10 and the customer cloud system 21a communicate, conversion settings between VID "102" and VID "201" are validated, and conversion settings between VID "101" and VID "102" and conversion settings between VID "101" and VID "201" are invalidated.

In addition, as illustrated in FIG. 21B, while the management server 10 and the customer system 11a communicate, conversion settings between VID "101" and VID "102" are validated, and conversion settings between VID "102" and VID "201" and conversion settings between VID "101" and VID "201" are invalidated.

In addition, as illustrated in FIG. 21C, while the customer system 11a and the customer cloud system. 21a communicate, conversion settings between VID "101" and VID "201" are validated, and conversion settings between VID "101" and VID "102" and conversion settings between VID "102" and VID "201" are invalidated.

Even by such a method, it becomes possible to perform setting automatically without causing an error.

Although the embodiments of this invention were explained above, this invention is not limited to those. For example, the functional block configuration of the management server 10 and the physical server 110, which are explained above, does not always correspond to actual program module configuration.

Moreover, the aforementioned data configuration is a mere example, and may be changed. Furthermore, as for the processing flow, as long as the processing results do not change, the turns of the steps may be exchanged or the steps may be executed in parallel.

Moreover, the customer system and the customer cloud system may include devices other than the physical server 110 (for example, a physical switch).

There is no restriction on order in which the management server 10 receives the CSID and the DSID, and the management server 10 may receive the DSID before the CSID.

The embodiments may also be applied to communication other than communication between the customer system 11a and the customer cloud system 21a (for example, communication between the customer system 11a and the customer cloud system 11c).

Moreover, communication performed by the customer cloud system may also be performed by the physical server 110 in the customer cloud system or a virtual server realized on the physical server 110. In the case where communication is performed by the physical server 110, setting for connection is performed for the physical server 110, and in the case where communication is performed by the virtual server, setting for connection is performed for the virtual server.

Moreover, the embodiments may be applied to a more complex network configuration such as a multi-cloud environment.

Figure 22:
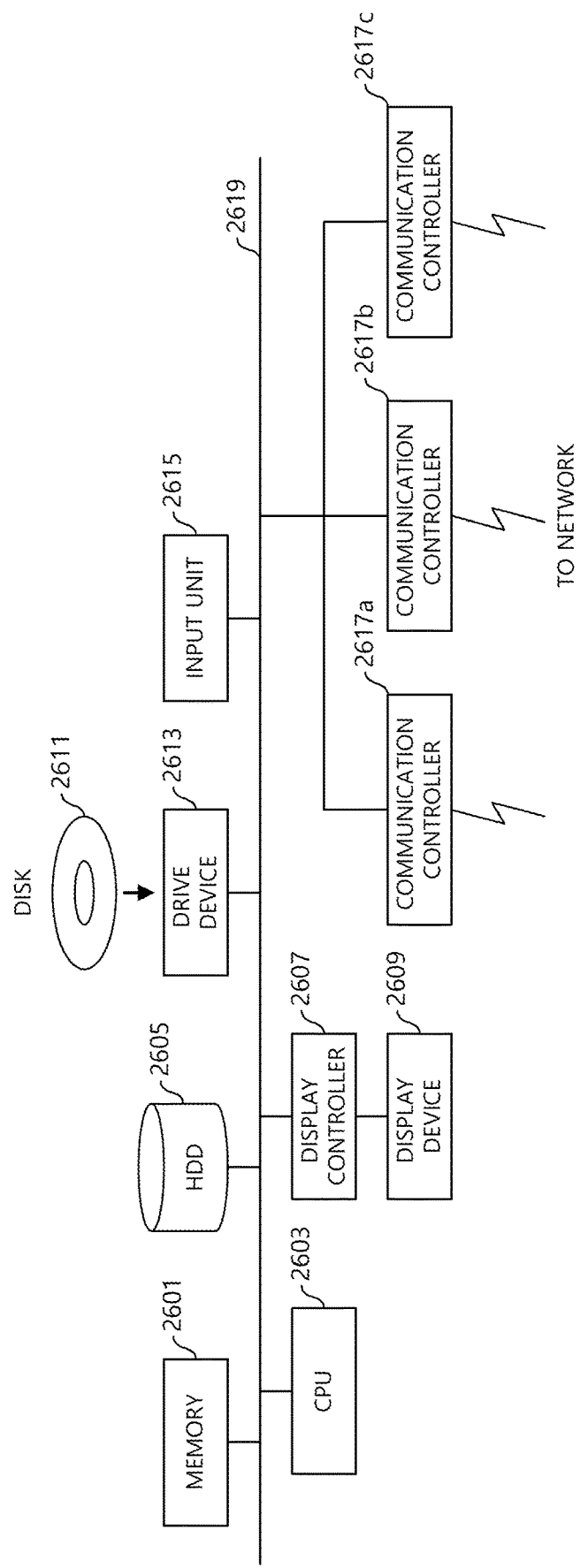
FIG. 22 is a functional block diagram of a switch.

In addition, aforementioned switches 12a to 12c, as illustrated in FIG. 22, a memory 2601, CPU 2603, Hard Disk Drive (HDD) 2605, display controller 2607 to be coupled with a display device 2609, drive device 2613 for a removable disk 2611, input unit 2615 and communication controllers 2617 (2617a to 2617c in FIG. 22) for coupling to a network are coupled with a bus 2619. Incidentally, according to circumstances, the display controller 2607, display device 2609, drive device 2613 and input unit 2615 may not be included. An operating system (OS) and application programs for carrying out a processing in these embodiments are stored in the HDD 2605, and read out from the HDD 2605 to the memory 2601 when being executed by the CPU 2603. If necessary, the CPU 2603 controls the display controller 2607, communication controllers 2617 and drive device 2613 to carry out necessary operations. Incidentally, data that was inputted through any one of the communication controllers 2617 is outputted through another communication controller 2617. The CPU 2603 controls the communication controllers 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The application programs may be installed into the HDD 2605 through the communication controller 2617 and the network such as the Internet. Such a computer apparatus realizes the aforementioned various functions by cooperating the hardware such as the CPU 2603, memory 2601 and the like with the OS and the application programs if necessary.

The aforementioned embodiments are summarized as follows:

A management apparatus that manages communication in a shared network (for example, the management server 10 in the embodiments) shared by information processing apparatuses of plural users (for example, the closed area network 13 in the embodiments), which relates to a first aspect of this embodiment, includes: a memory; and a processor coupled to the memory and configured to: receive, from a first information processing apparatus connected to the shared network (for example, the physical server 110 in the customer system. 11*a*), a first identifier assigned to the first information processing apparatus; receive, from a second information processing apparatus connected to the shared network (for example, the physical server 110 in the customer cloud system 21*a*), a second identifier assigned to the second information processing apparatus (for example, the receiver 1021 in the embodiments); determine whether a user of the first information processing apparatus coincides with a user of the second information processing apparatus based on the received first identifier and the received second identifier; and apply first settings to permit communication between the first information processing apparatus and the second information processing apparatus, upon determining that the user of the first information processing apparatus coincides with the user of the second information processing apparatus.

Since the first settings are applied after it is confirmed that communication is performed between the information processing apparatuses of the same user, it becomes possible to prevent an error of settings from occurring in the shared network shared by the information processing apparatuses of the plural users. The determination as to whether the users are the same includes determination as to whether the individuals, the corporations, the groups, the domains, or the like are the same.

Moreover, the processor may further be configured to: transmit, to the first information processing apparatus, a first request to transmit the first identifier; and transmit, to the second information processing apparatus, a second request to transmit the second identifier. (For example, the transmitter 1022, in the embodiments)

It becomes possible to synchronize a timing of receiving the first identification information and a timing of receiving the second identification information.

Moreover, the applying may include applying second settings to permit communication between the management apparatus and the first information processing apparatus and third settings to permit communication between the management apparatus and the second information processing apparatus, upon detecting a predetermined event, the transmitting the first request may include transmitting the first request to the first information processing apparatus, upon detecting that the second settings have been applied, the transmitting the second request may include transmitting the second request to the second information processing apparatus, upon detecting that the third settings have been applied, the receiving the first identifier may include receiving the first identifier from the first information processing apparatus that received the first request, and the receiving the second identifier may include receiving the second identifier from the second information processing apparatus that received the second request.

It becomes possible to receive the first identification information and the second identification information even when the management apparatus cannot communicate with the first information processing apparatus and the second information processing apparatus unless settings are applied in advance.

Moreover, the first settings, the second settings and the third settings may include settings to convert identifiers of virtual networks, which is included in communication data.

It becomes possible to prevent occurrence of errors in settings for communication among information processing apparatuses that belong to different virtual networks.

Moreover, the applying may include applying the first settings, the second settings and the third settings to switches that relays communication data between the first information processing apparatus and the second information processing apparatus.

The communication data is properly relayed.

Moreover, the applying may include deleting or invalidating the second settings and the third settings, upon determining that the user of the first information processing apparatus coincides with the user of the second information processing apparatus.

It becomes possible to prevent unnecessary communication.

Moreover, the determining may include determining whether management information including the first identifier and the second identifier is stored in a data storage unit that stores, for each user, management information including plural identifiers assigned to an information processing apparatus.

It becomes possible to properly determine whether communication is permitted or not even when plural identifiers are assigned.

Moreover, the determining may include determining whether the first identifier coincides with the second identifier.

When different information processing apparatuses are used by the same customers, there is a case where the same identifier is assigned to the information processing apparatuses. By performing processing as described above, it becomes possible to deal with such cases.

A shared network system related to a second aspect of this embodiment includes: information processing apparatuses of plural users; and a management apparatus that manages communication in a network shared by the information processing apparatuses of the plural users. And the management apparatus includes: a memory; and a processor coupled to the memory and configured to: receive, from a first information processing apparatus connected to the network, a first identifier assigned to the first information processing apparatus; receive, from a second information processing apparatus connected to the network, a second identifier assigned to the second information processing apparatus; determine whether a user of the first information processing apparatus coincides with a user of the second information processing apparatus based on the received first identifier and the received second identifier; and apply first settings to permit communication between the first information processing apparatus and the second information processing apparatus, upon determining that the user of the first information processing apparatus coincides with the user of the second information processing apparatus.

Since the first settings are applied after it is confirmed that communication is performed between the information processing apparatuses of the same user, it becomes possible to prevent an error of settings from occurring in the network shared by the information processing apparatuses of the plural users.

Moreover, the processor may further be configured to: transmit, to the first information processing apparatus, a first request to transmit the first identifier; and transmit, to the second information processing apparatus, a second request to transmit the second identifier, the first information processing apparatus may transmit the first identifier to the management apparatus when receiving the first request from the management apparatus, and the second information processing apparatus may transmit the second identifier to the management apparatus when receiving the second request from the management apparatus.

It enables the management apparatus to control timings of receiving the first identification information and the second identification information.

Moreover, the first information processing apparatus may transmit the first identifier to the management apparatus when it comes to a predetermined time or an instruction to transmit the first identifier is inputted, and the second information processing apparatus may transmit the second identifier to the management apparatus when it comes to the predetermined time or an instruction to transmit the second identifier is inputted.

Users of the first information processing apparatus and the second information processing apparatus may not like to receive data from other apparatuses from a viewpoint of security and the like. By performing processing as described above, it enables the first information processing apparatus and the second information processing apparatus to autonomously perform transmission without receiving data from another apparatus (that is, the management apparatus).

A management method includes: receiving, from a first information processing apparatus connected to a network, a first identifier assigned to the first information processing apparatus; receiving, from a second information processing apparatus connected to the network, a second identifier assigned to the second information processing apparatus; determining whether a user of the first information processing apparatus coincides with a user of the second information processing apparatus based on the received first identifier and the received second identifier; and applying first settings to permit communication between the first information processing apparatus and the second information processing apparatus, upon determining that the user of the first information processing apparatus coincides with the user of the second information processing apparatus.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A management apparatus that manages communication in a network shared by information processing apparatuses of a plurality of users, comprising:
    a memory; and
    a processor coupled to the memory and configured to:
        receive, from a first information processing apparatus connected to the network, a first identifier assigned to the first information processing apparatus;
        receive, from a second information processing apparatus that is different from the first information processing apparatus and connected to the network, a second identifier assigned to the second information processing apparatus;
        determine whether a first user of the first information processing apparatus to which the first identifier is assigned is the same as a second user of the second information processing apparatus to which the second identifier is assigned based on the received first identifier and the received second identifier; and
        perform first settings to permit communication between the first information processing apparatus to which the first identifier is assigned and the second information processing apparatus to which the second identifier is assigned, upon determining that the first user of the first information processing apparatus to which the first identifier is assigned is the same as the second user of the second information processing apparatus to which the second identifier is assigned.

2. The management apparatus according to claim 1, wherein the processor is further configured to:
    transmit, to the first information processing apparatus, a first request to transmit the first identifier; and
    transmit, to the second information processing apparatus, a second request to transmit the second identifier.

3. The management apparatus according to claim 2, wherein
    the applying comprises applying second settings to permit communication between the management apparatus and the first information processing apparatus and third settings to permit communication between the management apparatus and the second information processing apparatus, upon detecting a predetermined event,
    the transmitting the first request comprises transmitting the first request to the first information processing apparatus, upon detecting that the second settings have been applied,
    the transmitting the second request comprises transmitting the second request to the second information processing apparatus, upon detecting that the second settings have been applied,
    the receiving the first identifier comprises receiving the first identifier from the first information processing apparatus that received the first request, and
    the receiving the second identifier comprises receiving the second identifier from the second information processing apparatus that received the second request.

4. The management apparatus according to claim 3, wherein the first settings, the second settings and the third settings include settings to convert identifiers of virtual networks, which are included in communication data.

5. The management apparatus according to claim 3, wherein the applying comprises applying the first settings, the second settings and the third settings to switches that relays communication data between the first information processing apparatus and the second information processing apparatus.

6. The management apparatus according to claim 3, wherein the applying comprises deleting or invalidating the second settings and the third settings, upon determining that the user of the first information processing apparatus coincides with the user of the second information processing apparatus.

7. The management apparatus according to claim 1, wherein the determining comprises determining whether management information including the first identifier and the second identifier is stored in a data storage unit that stores, for each user, management information including a plurality of identifiers assigned to an information processing apparatus.

8. The management apparatus according to claim 1, wherein the determining comprises determining whether the first identifier coincides with the second identifier.

9. A shared network system, comprising:
  information processing apparatuses of a plurality of users; and
  a management apparatus that manages communication in a network shared by the information processing apparatuses of the plurality of users, wherein
  the management apparatus comprises:
    a memory; and
    a processor coupled to the memory and configured to:
      receive, from a first information processing apparatus connected to the network, a first identifier assigned to the first information processing apparatus;
      receive, from a second information processing apparatus that is different from the first information processing apparatus and connected to the network, a second identifier assigned to the second information processing apparatus;
      determine whether a first user of the first information processing apparatus to which the first identifier is assigned is the same as a second user of the second information processing apparatus to which the second identifier is assigned based on the received first identifier and the received second identifier; and
      perform first settings to permit communication between the first information processing apparatus to which the first identifier is assigned and the second information processing apparatus to which the second identifier is assigned, upon determining that the first user of the first information processing apparatus to which the first identifier is assigned is the same as the second user of the second information processing apparatus to which the second identifier is assigned.

10. The shared network system according to claim 9, wherein the processor is further configured to:
  transmit, to the first information processing apparatus, a first request to transmit the first identifier; and
  transmit, to the second information processing apparatus, a second request to transmit the second identifier,
  the first information processing apparatus transmits the first identifier to the management apparatus when receiving the first request from the management apparatus, and
  the second information processing apparatus transmits the second identifier to the management apparatus when receiving the second request from the management apparatus.

11. The shared network system according to claim 9, wherein the first information processing apparatus transmits the first identifier to the management apparatus when it comes to a predetermined time or an instruction to transmit the first identifier is inputted, and the second information processing apparatus transmits the second identifier to the management apparatus when it comes to the predetermined time or an instruction to transmit the second identifier is inputted.

12. A management method, comprising:
  receiving, from a first information processing apparatus connected to a shared network and by using a computer, a first identifier assigned to the first information processing apparatus;
  receiving, from a second information processing apparatus that is different from the first information processing apparatus and connected to the shared network and by using the computer, a second identifier assigned to the second information processing apparatus;
  determining, by using the computer, whether a first user of the first information processing apparatus to which the first identifier is assigned is the same as a second user of the second information processing apparatus to which the second identifier is assigned based on the received first identifier and the received second identifier; and
  performing, by using the computer, first settings to permit communication between the first information processing apparatus to which the first identifier is assigned and the second information processing apparatus to which the second identifier is assigned, upon determining that the first user of the first information processing apparatus to which the first identifier is assigned is the same as the second user of the second information processing apparatus to which the second identifier is assigned.

* * * * *